United States Patent
Accordino et al.

(10) Patent No.: US 12,037,183 B2
(45) Date of Patent: Jul. 16, 2024

(54) REUSABLE CONTAINER FOR TRANSPORTING, INSPECTING, AND/OR STORING A FUEL CELL

(71) Applicant: American Fuel Cell and Coated Fabrics Company, LLC, Magnolia, AR (US)

(72) Inventors: Michael Accordino, Manhattan Beach, CA (US); Adam Garfein, Ypsilanti, MI (US); Scott McMurtry, Springhill, LA (US); Todd Wine, Magnolia, AR (US); Faith Elliott, Camden, AR (US); Travis Williams, Magnolia, AR (US); Anil Menawat, Saline, MI (US)

(73) Assignee: American Fuel Cell and Coated Fabrics Company, LLC, Magnolia, AR (US)

( * ) Notice: Subject to any disclaimer, the term of this patent is extended or adjusted under 35 U.S.C. 154(b) by 0 days.

(21) Appl. No.: 18/047,147

(22) Filed: Oct. 17, 2022

(65) Prior Publication Data

US 2024/0124218 A1    Apr. 18, 2024

(51) Int. Cl.
B65D 85/30    (2006.01)

(52) U.S. Cl.
CPC .................................. B65D 85/307 (2013.01)

(58) Field of Classification Search
CPC ... B65D 85/307; B65D 85/30; B65D 2585/88
USPC ...... 206/386, 595–600, 521.2, 523; 220/1.5; 410/117, 87, 60
See application file for complete search history.

(56) References Cited

U.S. PATENT DOCUMENTS

| | | | | |
|---|---|---|---|---|
| 4,932,551 A | * | 6/1990 | Thomas | B67D 7/0288 222/548 |
| 5,160,025 A | * | 11/1992 | Greenawald | B65D 81/264 206/703 |
| 5,824,995 A | * | 10/1998 | Wise | B60P 3/426 219/393 |
| 7,017,741 B1 | * | 3/2006 | Williamson | F17C 13/084 206/386 |
| 7,063,212 B2 | * | 6/2006 | Ordonez | B65D 77/02 220/849 |
| 7,475,796 B2 | * | 1/2009 | Garton | B65D 90/12 211/183 |
| 11,505,401 B1 | * | 11/2022 | Broussard | B65D 88/123 |
| 2004/0173494 A1 | * | 9/2004 | Elstone, Sr. | B65D 77/061 206/524.4 |

(Continued)

FOREIGN PATENT DOCUMENTS

| | | | | |
|---|---|---|---|---|
| CA | 3046516 A1 | * | 1/2020 | ............ B65D 33/02 |
| DE | 102016119240 A1 | * | 4/2018 | |
| DE | 202018101600 U1 | * | 5/2018 | |

*Primary Examiner* — Rafael A Ortiz
(74) *Attorney, Agent, or Firm* — Stoel Rives LLP (57) ABSTRACT

A reusable container for transporting, inspecting, and/or storing a fuel cell or other item may include a crate or box lined with plurality of cushioning inserts to protect a fuel cell placed within the container, and a plurality of straps that extend inwardly from walls of the container and couplable to the fuel cell. The straps are tensionable to suspend at least a portion of the weight of the fuel cell from the walls of the container while a portion of the fuel cell may rest on top of cushioning inserts at the floor of the container.

23 Claims, 7 Drawing Sheets

(56) References Cited

U.S. PATENT DOCUMENTS

| | | | |
|---|---|---|---|
| 2012/0152798 A1* | 6/2012 | Allegretti | B65D 88/005 |
| | | | 206/386 |
| 2015/0027917 A1* | 1/2015 | Goddard | B65D 19/18 |
| | | | 206/386 |
| 2021/0214147 A1* | 7/2021 | McCully | B65D 85/30 |

* cited by examiner

REUSABLE CONTAINER FOR TRANSPORTING, INSPECTING, AND/OR STORING A FUEL CELL

TECHNICAL FIELD

The present disclosure relates generally to the field of containers for transportation and/or storage. More particularly, some embodiments relate to reusable containers for transporting, inspecting, and storing fuel cells for aircraft, or other large items, and especially items requiring special handling to avoid damage or degradation.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION OF PREFERRED EMBODIMENTS

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

Figure 1:
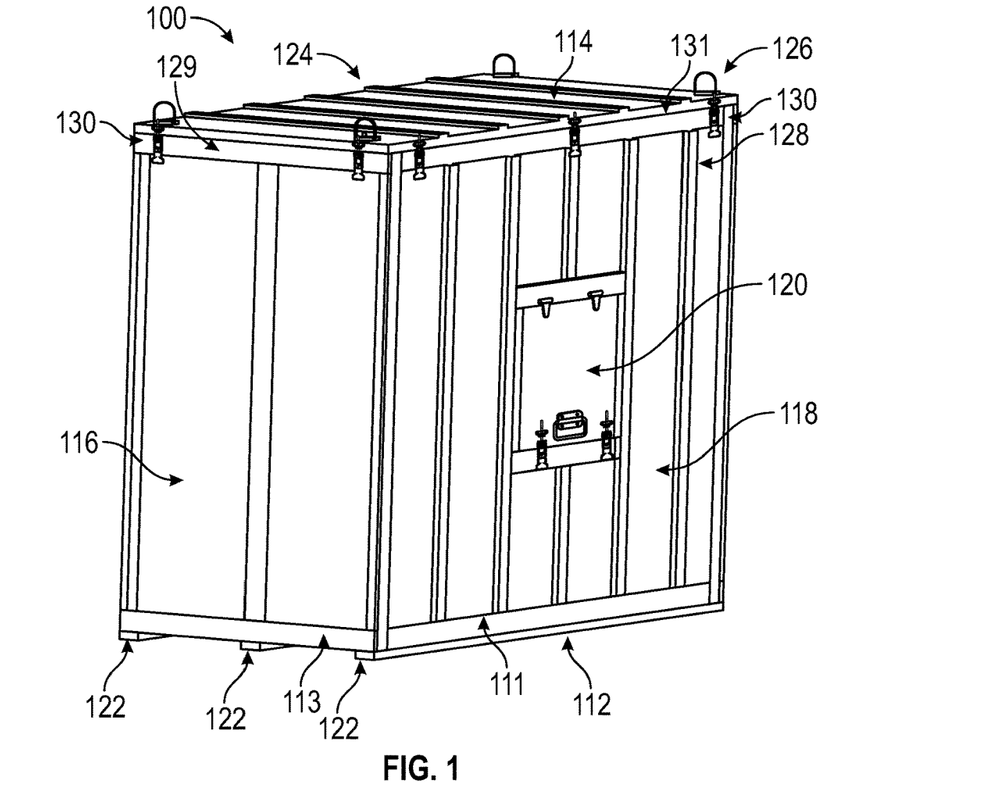
FIG. 1 is a perspective view of a container for a fuel cell according to one embodiment of the present disclosure.

FIG. 1 illustrates an exemplary container 100 for a fuel cell. As further described herein, the container 100 is designed to receive and house or contain a fuel cell or other product, and to protect and/or preserve the fuel cell 10 (FIG. 8) or other product during transport (shipment), inspection, and/or storage, and may also serve purposes or provide benefits other than, or in addition to, those described herein. For example, partially assembled containers 100 consistent with the present disclosure may also be used in a fuel cell manufacturing process as a carrier or platform for moving the fuel cell along a production line or between workstations in a manufacturing environment. Similar containers consistent with the present disclosure may be used in packaging, transportation (including shipping), storage, and the like, of various other items, and especially fragile or volatile items such as electronics, optical systems, glass, munitions, etc. Items kept inside of the container are protected from the structure of the container as further described below.

Figure 8:
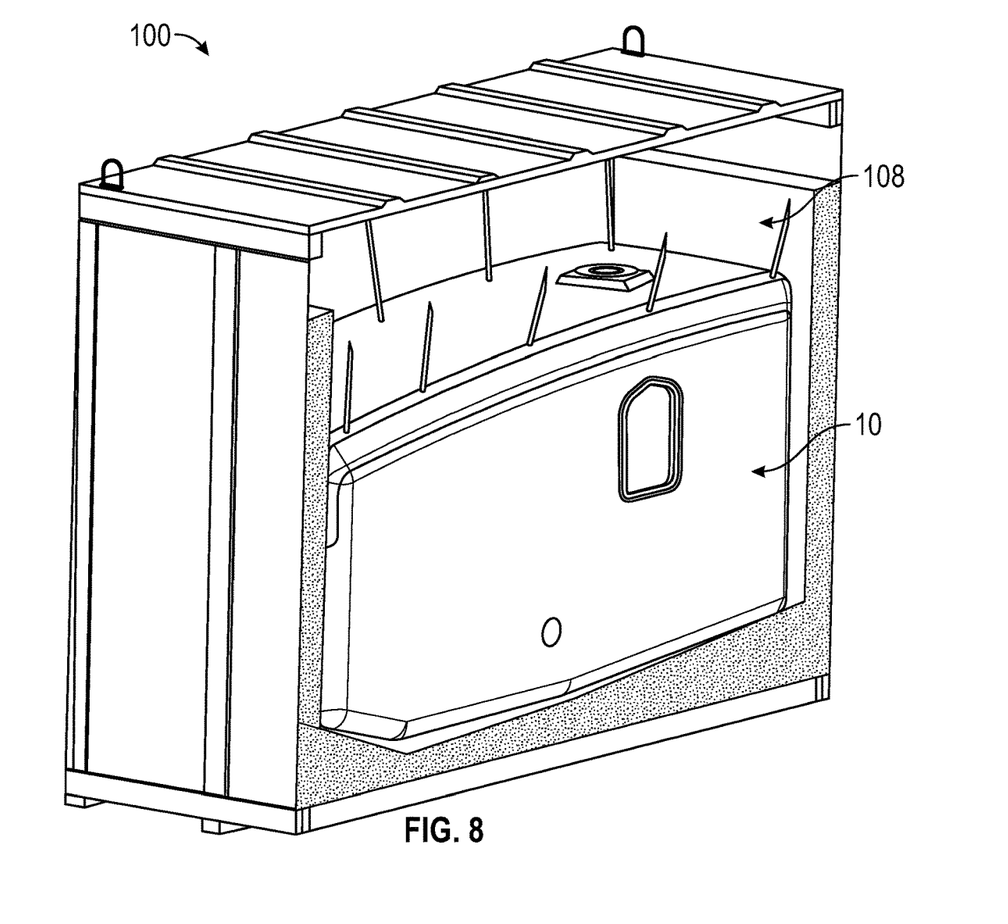
FIG. 8 is a perspective view of a package including the container of FIG. 1 holding a fuel cell with one of the outer side walls of the container removed to show how the fuel cell is supported by cushioning foam inserts and internal support straps.

A fuel cell 10 is illustrated in FIG. 8 in the form of a collapsible liquid fuel bladder. As used herein, the term "fuel cell" encompasses aviation fuel cells, also known as fuel tanks or fuel bladders, which may be made of flexible material such as a composite rubber laminate (as illustrated) that is self-sealing in the event of a puncture, but may also include other types of rigid or flexible fuel tanks, fuel bladders or fuel cells. For simplicity, the present disclosure will focus on how a fuel cell interacts with the container 100; however, the present disclosure is not limited to containers for fuel cells. For example, the container 100 may be adapted for transporting or storing bladders for food stuffs, water, chemicals and other non-fuel items, or transporting or storing various other fragile or volatile items.

With reference to FIGS. 1-4, the container 100 in the illustrated embodiments comprises a substantially orthotope or hyperrectangle shape bounded by six quadrilateral faces; however, the present disclosure is not limited to an orthotope or hyperrectangle shape. Other shapes, such as cylindrical or hexagonal shapes may be used in some embodiments. The container 100 may include a floor 112 forming a lower surface of the container 100, a top wall 124 forming an upper surface of the container 100, a pair of opposing lateral side walls 116 (end walls), and a pair of opposing longitudinal side walls 118 (right and left side walls), wherein the side walls 116, 118 form side surfaces of the container 100. The floor 112 and walls 116, 118, 124 define an interior space (or cavity) 108 of the container 100 sized to receive the fuel cell 10. The top wall 124 may be removable from the container 100 to access the cavity 108 of the container and the fuel cell 10 within the cavity of the container 10. One or more of the side walls 116, 118 may also or alternatively be removed from the container 100 to access the cavity 108 of the container and the fuel cell 10 within the container 100. The top wall 124 may be attached to upper margins of the side walls 116, 118 of container 100 after the fuel cell 10 is placed within the cavity 108 of the container 100. In some embodiments, one or more of the side walls 116, 118 may be attached after the fuel cell 10 is placed within the cavity 108 of the container 100. Once the fuel cell is placed in the container 100 and the container 100 is closed by replacing and attaching one or more of the walls 116, 118, 124 that was previously removed, the package comprising the container 100 and fuel cell 10 may then be shipped to its destination for use, inspection, and installation or storage of the fuel cell 10. When needed, one or more of the top wall 124 or side walls 116, 118 may be removed from the container 100 (e.g. en route, or at the destination) to facilitate inspection of the fuel cell 10 or its removal from the container 100. In the embodiment illustrated, the top wall 124 is removably attached to the side walls 116, 118 by a plurality of quick-release fasteners, such as toggle latches 130 (further described below with reference to FIG. 13), which are attached to, and spaced apart along, the top margins of the side walls 116, 118. Various other quick-release and/or non-quick-release fasteners may be used in place of or in addition to toggle latches 130 for removably attaching top wall 124 or other walls to the rest of the container 100.

The surface of one or more of the side walls 116, 118 may include an inspection opening that is closed by an access door 120 or other cover, which may be manually opened to allow inspection of the fuel cell 10, as is further described below with specific reference to FIG. 2.

The container 100 may be fabricated from a number of different materials, such as materials that are durable and are at least partly rigid. For example, in the illustrated embodiment, the floor 112 and walls 116, 118, 124 of container 100 are fabricated from wood. However, the container 100 may alternatively be fabricated from metal, hardened plastics, composites, and the like, to protect the fuel cell 10 or other products held within the container from environmental conditions and from accidental damage during shipment or storage. In some embodiments, the container 100 may be fabricated from a material that does not corrode or degrade due to environmental factors such as humidity, temperature, salt water, sunlight (UV degradation), wind and the like, as the container 100 may be stored in an environment that may include the above-noted environmental factors, such as a ship or in a desert.

The container 100 may be stackable on other similar containers. For example, the container 100 may be stacked on top of another identical container, which is useful for storage of the multiple containers 100 and fuel cells 10. The top wall 124 may include a plurality of lateral struts 114 or other framing or support members supporting a panel, and together forming a rigid, solid wall. Similarly, each of the upstanding side walls 116 and 118 may also include a frame assembled from vertical struts 128 or other framing or support members supporting a panel to form a rigid, solid side wall. The lateral struts 114 on top wall 124 help support one or more additional containers or other items when stacked on top of the container 100, and to distribute the weight of the additional container(s) or other items to the lateral and/or longitudinal side walls 116, 118 of the container 100, and preferably focusing the stacked loads onto vertical struts 128 of the side walls 116.

In an alternative embodiment (not illustrated) structural members of struts, slats and/or other framing members may be assembled to form top wall 124 and side walls 116, 118 with openings between the framing members, struts, or slats, in which case the container may be best characterized as a crate.

The floor 112 may comprise a deck, which may be formed by a bottom panel or slats, longitudinal frame members 111, and/or lateral frame members 113. In the illustrated embodiments, three or more stringers 122 are disposed beneath the deck and provide structural support for the deck. The stringers 122 are preferably aligned longitudinally and spaced apart along the lateral edge of the floor 112 to enable forks of a forklift to be inserted between the stringers 122 for lifting and moving the container 100. In some embodiments, the stringers 122 may include notches 138 (FIG. 4) spaced apart along their length to allow forklift forks to be inserted from the longitudinal sides of the container, in addition to allowing fork insertion from either end of the container 100.

Figure 14:
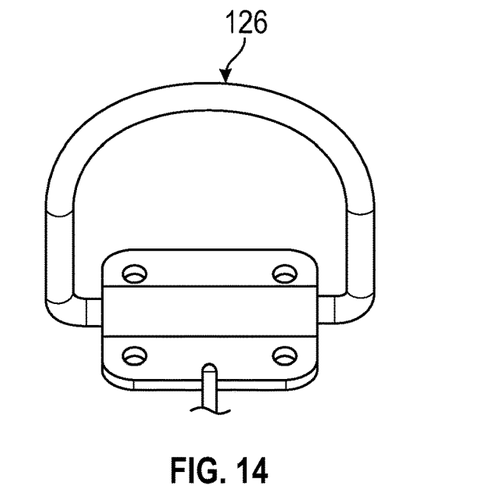
FIG. 14 is a detailed view of a lift point of the container of FIG. 1.

The top wall 124 of the container 100 may include a plurality of lift points 126 that are interspersed on the top wall 124 and fastened to the top wall 124. The lift points 126 may be D-rings, as illustrated in FIGS. 1-3, or other lifting hardware, such as hoist rings, shackles, or eyebolts. FIG. 14 illustrates a detailed view of one of the D-rings. In the illustrated embodiment of FIGS. 1-3, the lift points 126 are positioned near the corners of the top wall 124. When the toggle latches 130 are decoupled, the upper surface 124 may be removed from the box 100. A crane may be coupled to each of the lift points 126 to lift the top wall 124 from the container 100 after the toggle latches 130 are decoupled. In some embodiments, three or more sets of lift point hardware 126 are secured along the periphery of the upper surface of top wall 124 in spaced-apart relation for stable lifting of the top wall 124. For example, four sets of lift point hardware 126 may be used, with one set in each corner of the top wall 124. In still other embodiments, a single lift point may be mounted centrally on top wall 124. In addition, when the toggle latches 130 are coupled and lock the top wall 124 to the walls 116, 118 of container 100, a crane may be coupled to each of the lift points 126 to lift the entire container 100 and place it on top of another container.

The container 100 may be sized to house different sized fuel cells 10. For example, the container 100 may be able to store a forward fuel cell, an aft fuel cell, or the like. Forward fuel cells may be smaller than aft fuel cells. Accordingly, a container 100 for a forward fuel cell would be smaller than a container for an aft fuel cell. The appropriately sized container 100 may store either a left, right or side fuel cell of the aft or forward fuel cell variety, or any other fuel cell position on an aircraft.

Figure 13:
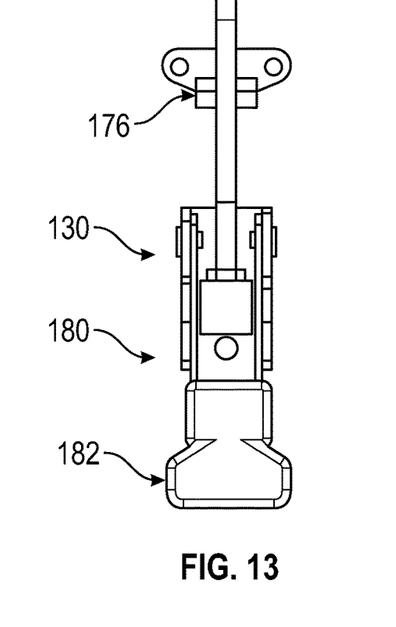
FIG. 13 is a detailed view of a toggle latch fastener of the various containers of FIGS. 1-5.

FIG. 13 illustrates a detailed view of one of the toggle latches 130 used to attach top wall 124 to side walls 116, 118. Toggle latch 130 includes a base portion 176 (also known as the catch or strike plate) that is affixed to top wall 124 and a latch portion 180 (also known as the hook or claw) that that is secured to the side wall 116, 118. The latch portion 180 is detachably coupled to the base portion 176 and operated via a lever 182 that has a cam action allowing manual release of the latch portion 180 for removal of the top wall 124, while preventing accidental release. In the illustrated embodiment of FIG. 1, the container 100 comprises two toggle latches 130 spaced apart along the top margin 129 of each lateral side wall 116, and three toggle latches 130 spaced apart along the top margin 131 of each longitudinal side wall 118. However, there may be more or less than the illustrated number of toggle latches 130. Further, other types of fasteners may be used other than the illustrated fastener.

Figure 2:
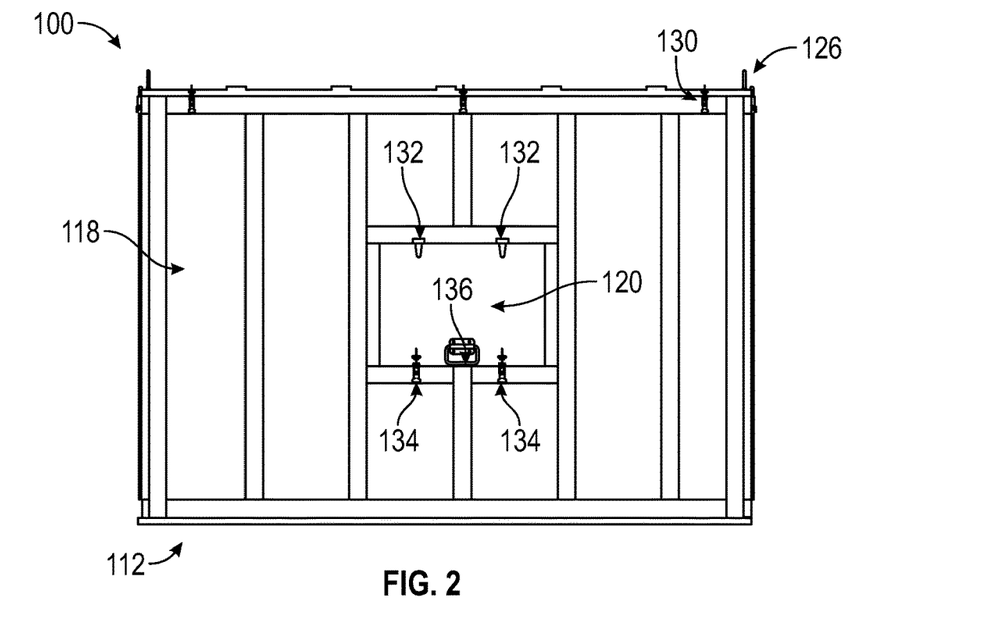
FIG. 2 is a length side view of the container of FIG. 1.
Figure 3:
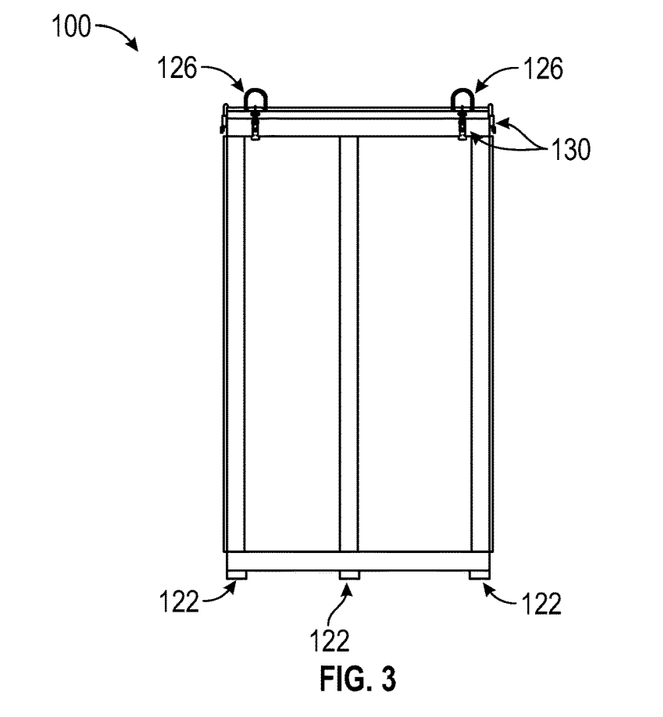
FIG. 3 is a width side view of the container of FIG. 1.

FIG. 2 is a longitudinal side view of the container 100. With reference to FIG. 2, the surface of each of the longitudinal side walls 118 has an inspection opening that is closed by the access door 120 or other cover, which may pivotably open so that the fuel cell 10 may be inspected. Each access door 120 is preferably attached to the side walls 118 by a plurality of hinges 132. The access door 120 may further include a plurality of fasteners 134, such as toggle latches, along an edge opposite hinges 132, to secure the access door 120 in a closed configuration as illustrated. The access door 120 could be alternatively configured with hinges 132 in other locations, to open downwards, side-to-side, or the like. The access door 120 may include a handle 136 to grab the door to opening or closure. In other embodiments (not illustrated), the access door 120 or cover, may be attached over the inspection opening by other means, with or without hinges.

The inspection opening and access door 120 allow a person to look into the cavity of the box 100. For example, a person may open the access door 120 when the fuel cell 10 is stored within the box 100 to visually inspect the fuel cell 10 before opening the container 100. In some embodiments, the inspection opening and access door 120 may be disposed in a location in alignment with a particular feature of the fuel cell 100 or other product housed within the container 100. For example, the inspection opening may be aligned with a serial number on the fuel cell 10, so that that when the access door 120 is opened the serial number can be read without having to open the entire container 100 and/or remove the fuel cell 10 from the container.

Figure 4:
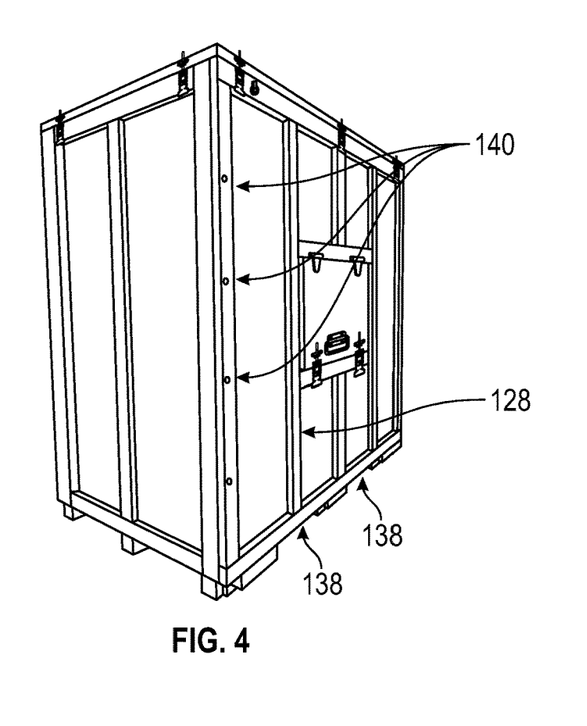
FIG. 4 is a pictorial view of a container for a fuel cell according to another embodiment of the present disclosure.

FIG. 4 is a perspective view of the container 100 of FIG. 1. With reference to FIG. 4, longitudinal stringers 122 supporting the floor 112 (FIG. 1) may include notches 138 that accommodate shipping straps (not shown) which may be wrapped vertically around the container 100 and over top wall 124, to secure the container 100 and prevent accidental opening of top wall 124. The notches 138 may also enable a forklift to place its forks through the longitudinal side of container 100, to lift the container 100 for handling or stacking on top of another container 100.

Figure 5:
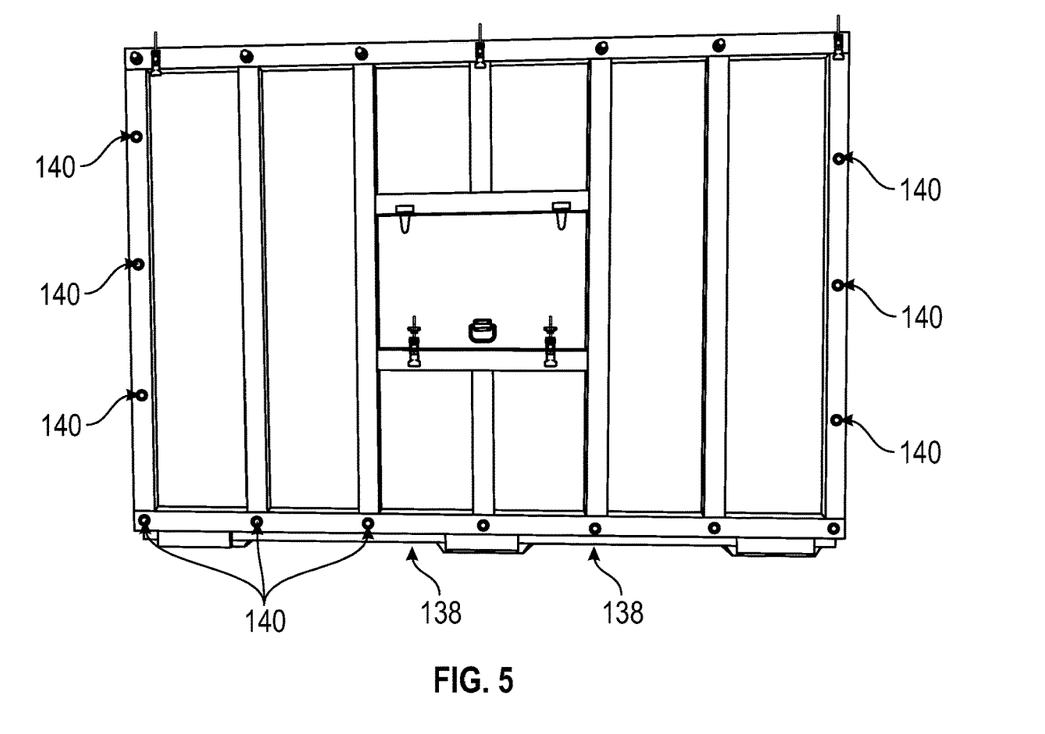
FIG. 5 is a side view of the container of FIG. 4.
Figure 6:
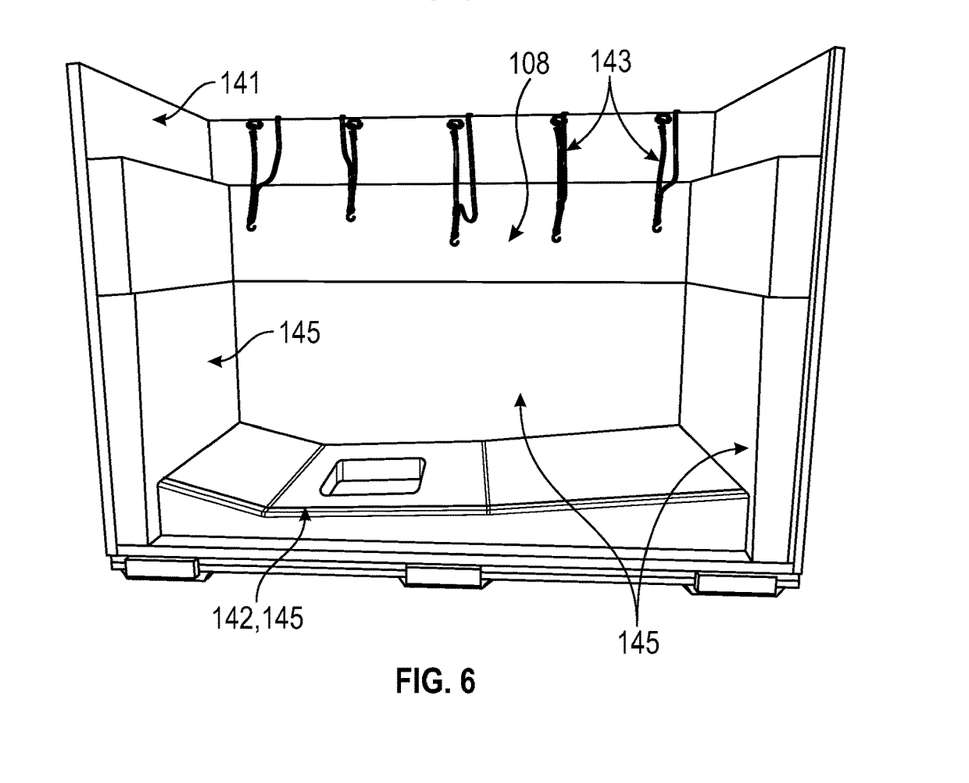
FIG. 6 is side view of the container of FIG. 4 with a side wall of the container removed to show cushioning foam inserts and internal support straps.

With reference to FIGS. 4-5, the longitudinal side walls 118 are attached to the floor 112 and end walls 116 by lag screws 140, lag bolts, or other suitable fasteners. Each of the longitudinal side walls 118 can be removed by unscrewing lag screws 140 along side and bottom edges of the longitudinal side wall 118, and de-latching toggle latches 130 along the top edge of longitudinal side wall 118, as illustrated in FIG. 6. Removal of a longitudinal side wall 118 enables inspection, insertion, removal of the fuel cell 10 (FIG. 8) within the cavity 108 of the container 100. The removed longitudinal side wall 118 may be reattached by re-securing it with lag screws 140 or another suitable fastener. End walls 116 may be removable in a similar manner to allow inspection, insertion, or removal of fuel cell 10.

FIG. 6 is a longitudinal side pictorial view of the container 100 showing detail of a plurality of cushioning inserts 145. The cushioning inserts 145 may be fabricated of blocks of closed-cell foam or from one or more sections of another material that is not susceptible to generating foreign object debris (FOD). The cushioning inserts 145 are preferably sized and shaped to nest snugly within the cavity 108 of container 100 and to cradle and support the fuel cell 10 above the floor 112 of the container 100 and away from the side walls 116, 118. The cushioning inserts 145 may support the top, bottom, aft, forward, and inboard sides of the fuel cell 10. The cushioning inserts 145 may be pieced together within the cavity 108 of the container 100 to support the fuel cell 10. In some embodiments (not illustrated), a single contoured cushioning insert may line both the floor 112 and walls 116, 118 of the container 100. In some embodiments, the fuel cell 10 is not rigid; therefore, the cushioning inserts 145 are configured to support the fuel cell 10 so that the fuel cell 10 does not substantially deform during transportation and storage of the fuel cell 10 in the container 100. In some embodiments, a plurality of straps 143 may extend inwardly from the walls 116, 118 of the container 100 between or over the cushioning inserts 145. As further described below with reference to FIGS. 8-12, the straps 143 are detachably attached to the fuel cell 10 to suspend at least a portion of the fuel cell 10 from the walls 116, 118 of the container 100.

The walls 116, 118 of the container 100 may be lined with a smooth material such as cardboard 141 or the like, which may facilitate assembly of container 100 and may further inhibit abrasion of cushioning inserts 145 and help prevent FOD.

The straps 143 may be fabricated from a number of different materials that are configured to hold the fuel cell 10 over a long period of time. The fuel cell 10 may weigh between 50 pounds and 500 pounds and may be in storage for up to 15 to 25 years. Accordingly, the materials for the straps 143 need to be able to withstand the tension from the weight of the fuel cell 10 for a prolonged period of time with minimal elasticity or elongation. Exemplary materials include steel or metallic straps, plastic straps, and/or webbing formed of polyester, polypropylene, or nylon, and the like. In some embodiments, the straps 143 may include a coating on the straps to strengthen the straps 143.

In some embodiments, the fuel cell 10 may be wrapped in a plastic bag to protect the fuel cell 10 from the cushioning inserts 145 so that the foam material of the inserts 145 is not abrasive to the fuel cell 10 during transportation and/or storage of the fuel cell 10.

In the embodiment illustrated, one of the cushioning inserts 145 is a lower foam component 142. The lower foam component 142 is disposed on the floor 112 of the container 100. The fuel cell 10 is configured to engage with the lower foam component 142 but not compress the lower foam component 142 due to the plurality of straps 143 that enable the fuel cell 10 to float within the container 100.

Figure 7:
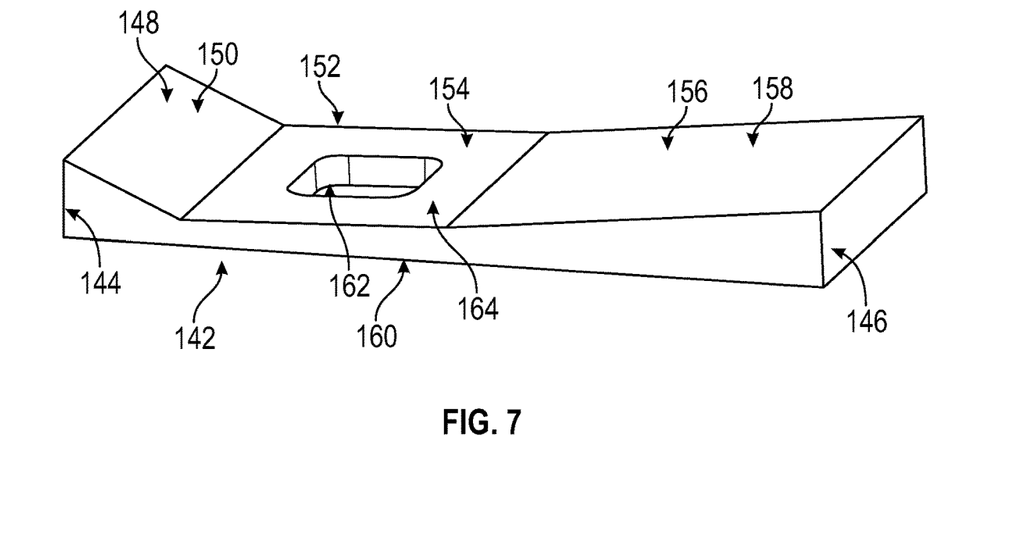
FIG. 7 is a perspective view illustrating a lower one of the cushioning foam inserts of FIG. 6.

FIG. 7 illustrates a detailed view of the lower foam component 142. The lower foam component 142 comprises a first end 144 and a second end 146. The lower foam component 142 further comprises three distinct sections, a first section 148, a second section 152, and a third section 156. An upper surface 150 of the first section 148 may have a first slope that slopes downward from a first end 144 toward the second end 146. The first slope may be a constant slope or a curve. An upper surface 154 of the second section 152 may have a second slope that slopes upward toward the second end 146. The second slope may be a constant slope or a curve. An upper surface 158 of the third section 156 may have a third slope that slopes upward toward the second end 146 at an incline that is greater than the second slope of the second section 152. The third slope may be constant or curved. The slope of the first section 148 may be greater than the second slope and the third slope, although it slopes in an opposite direction. The third slope is greater than the second slope.

A lower surface 160 of the lower foam component 142 is preferably a flat surface that extends from the first end 144 to the second end 146. In the illustrated embodiment, the second section 152 comprises an aperture 162 that extends from a top surface 164 to the lower surface 160 of the lower foam component 142. Other ones of the cushioning inserts 145 may also include one or more similar apertures extending therethrough, depending on the design and shape of the fuel cell 10. The cushioning inserts 145, and especially lower foam component 142, may be replaceable by a foam components having a different shape for fitting differently sized or shaped fuel cells or other products in a common structural container 100.

In some embodiments, when the fuel cell 10 is removed from the container 100, the fuel cell 10 may be placed on the lower foam component 142 to prevent the fuel cell from 10 being placed on a dirty surface and to provide support for the bottom contour of the fuel cell 10.

In some embodiments, the container 100 may be placed in a larger container (not shown) to protect the container 100 from harsh elements, such as humidity, temperature, salt water, and the like, and the larger container may environmentally control the surrounding for the container 100 within the larger container.

Figure 9:
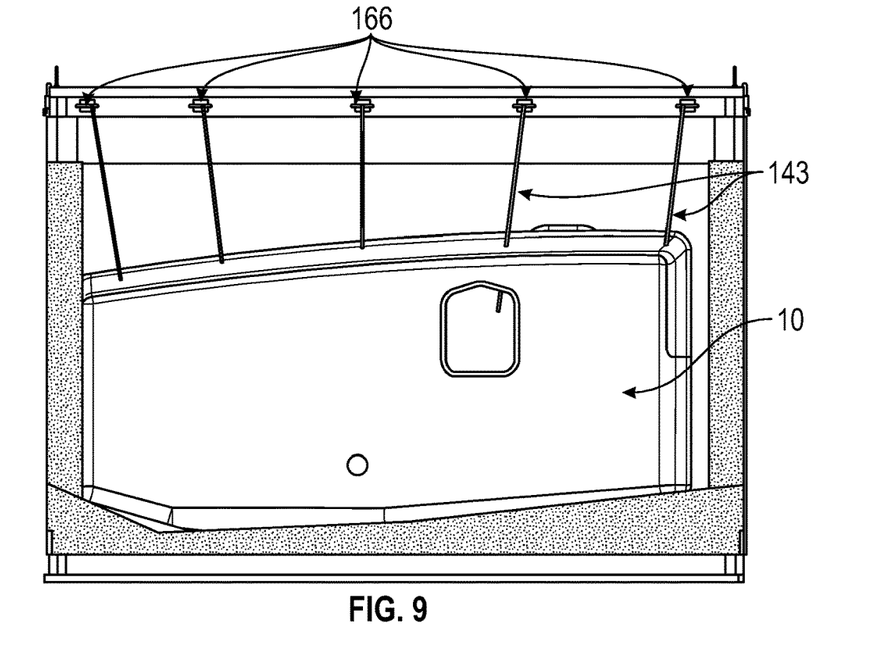
FIG. 9 is a side view of the package of FIG. 8.
Figure 10:
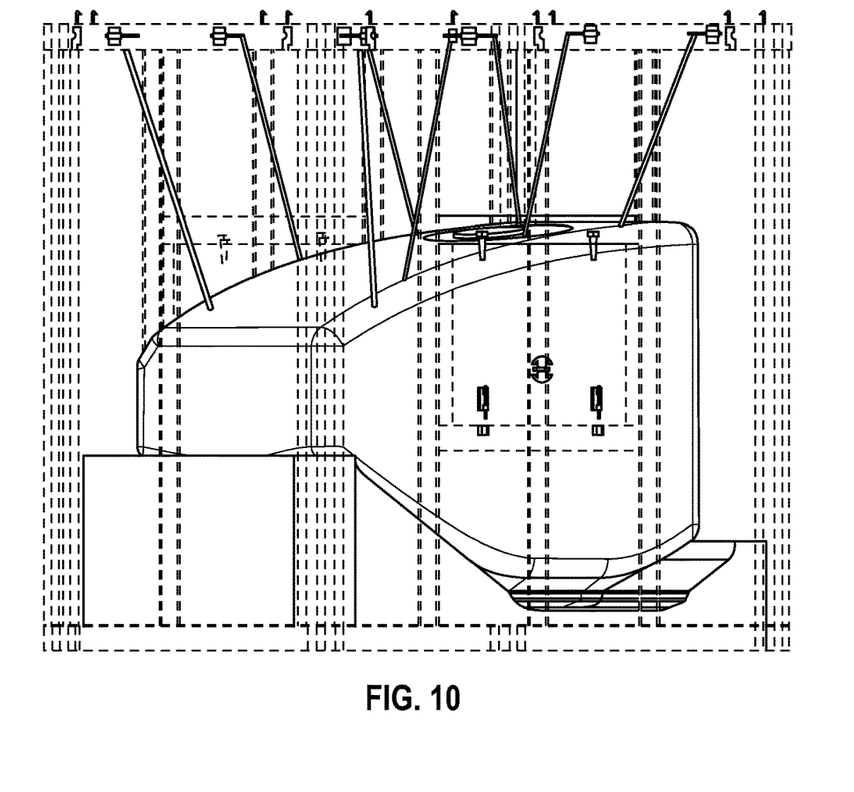
FIG. 10 a perspective view of the container of FIG. 1 with side walls and end walls of the container illustrated in phantom to show a fuel cell, cushioning inserts, and support straps within the interior space of the container.
Figure 11:
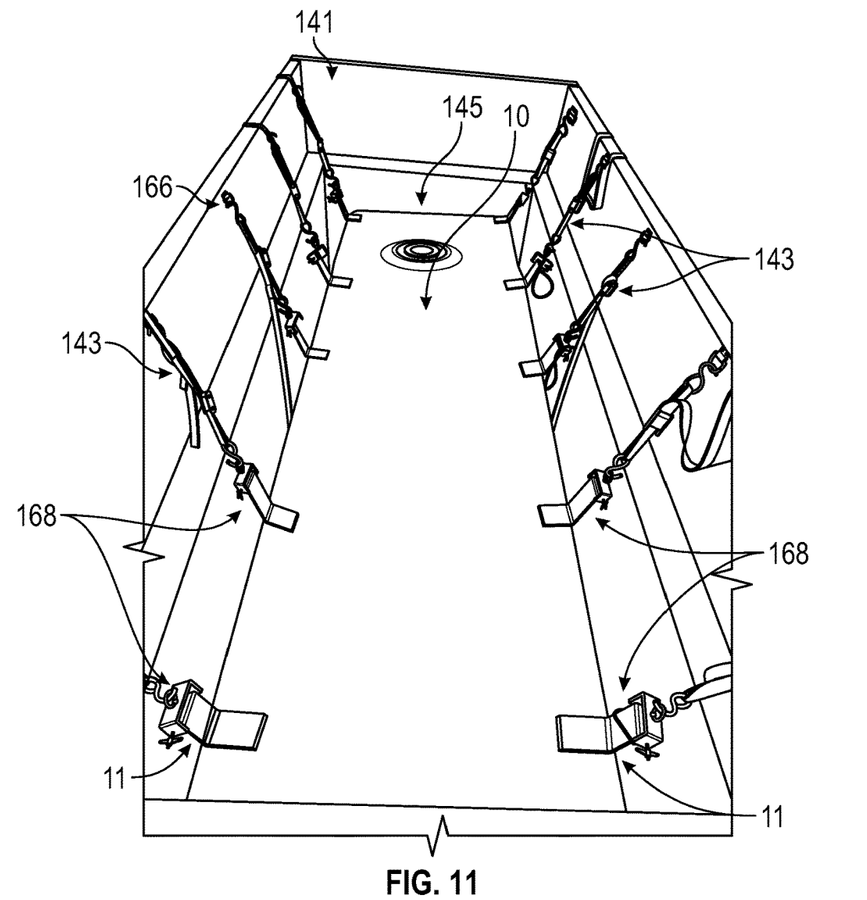
FIG. 11 is a top pictorial view of a container according to an embodiment, with a top wall of the container removed to show the fuel cell positioned in the container and partially suspended from the walls of the container by a plurality of support straps.
Figure 12:
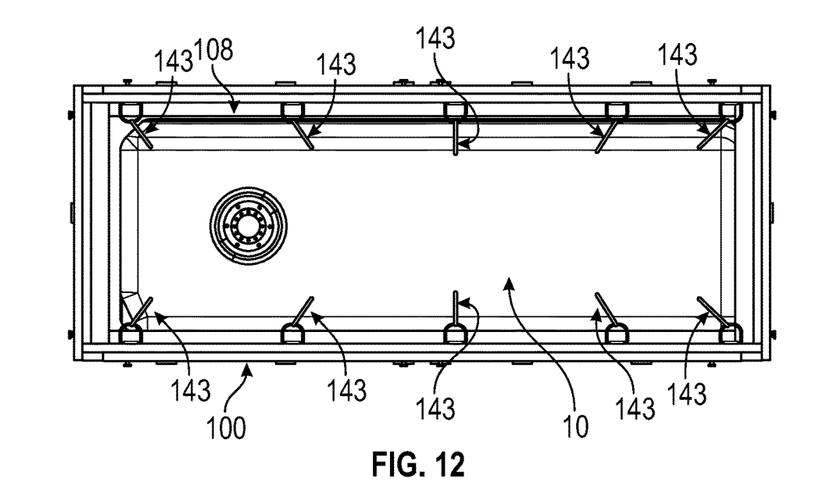
FIG. 12 is a top view of the container of FIG. 1 with the top wall removed to show detail of the fuel cell and support straps.

FIG. 8-12 illustrate the fuel cell 10 stored within the cavity 108 of the container 100. The fuel cell 10 is supported inside the cavity 108 through a variety of different means. FIG. 8 illustrates a perspective cross-sectional view of the container 100 with the top wall 124 attached to the container 100. FIG. 9 illustrates a cross-sectional view of the container 100 with the top wall 124 attached to the container 100. FIG. 10 illustrates a cross-sectional view of the container 100 with the fuel cell 10 inside the container 100. FIG. 11 illustrates a picture of the container 100 from a top perspective view with the top wall 124 removed. FIG. 12 illustrates a top view of the container 100 with the top wall 124 removed.

FIG. 11 shows a top pictorial view of the container 100 with the top wall 124 removed to show the fuel cell 10. The lifting straps 143 are connected to a plurality of b-rings 166 that are spaced apart along the top inner sides of the side walls 116, 118 of the container 100 and affixed thereto. The D-rings 166 and straps 143 are distributed on opposite sides of the interior space 108 and are preferably attached to framing members of the side walls 116, 118. The lifting straps 143 extend inwardly from the side walls 116, 118 and attach to the fuel cell 10 via connectors 168, such as a hook, which are detachably connected to a series of attachment loops fixed to the outside of the fuel cell 10 in spaced-apart relation. Each of the straps 143 includes an adjustable section having a length that is adjustable for tensioning the strap 143 when attached to the fuel cell 10. The attachment loops of the fuel cell 10 may comprise straps 11 or the like. The connector 168 may be slidable along the strap 143 when the length of an adjustable section of the strap is adjusted.

Figure 15:
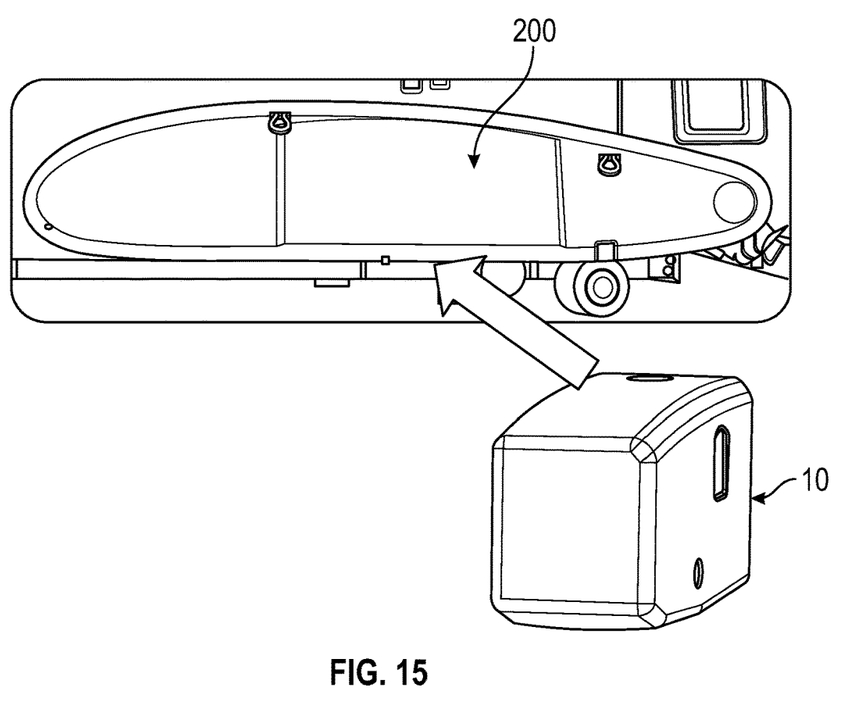
FIG. 15 is a side view of a vehicle with a fuel cell about to be installed into the vehicle.

When the customer is ready to install the fuel cell 10 into the vehicle, the fuel cell 10 may be removed from the container 100. The fuel cell 10 may be installed into any of a number of different vehicles. As discussed above, the top wall 124 may be removed from the container 100 as illustrated in FIG. 11. The fuel cell 10 may then be lifted out of the container via a crane or other sort of mechanism. Alternatively, the fuel cell 10 may be removed from either side of the container 100 by removing either longitudinal side wall 118. Once the fuel cell 10 is removed from the container 100, the fuel cell 10 may be installed into the aircraft or other vehicle 200 that requires fuel or other liquid to support its operation, as is illustrated in FIG. 15. The fuel cell 10 can be installed on the interior of the vehicle 200 or its fuselage, in a wing, in a sponson (as shown), or in other portions of the vehicle 200. In another embodiment, a method of transporting and/or storing a fuel cell comprises steps of providing a container 100 of the kind described above, having a floor 112 and a plurality of walls 116, 118 defining an interior space 108, and at least one resilient cushioning insert 145 nested within the interior space, and a plurality of straps 143 distributed along at least some of the walls on opposing sides of the interior space 108 and extending inwardly from the walls 116, 118 of the container 100. The method involves positioning the fuel cell 10 within the interior space 108 so that the cushioning insert 142, 145 cradles and supports the fuel cell 10 above the floor 112 and away from the walls 116, 118; then attaching the straps 143 to the fuel cell 10 and tensioning the straps 143 until at least a portion of the fuel cell 10 is suspended from the walls 116, 118. Subsequently, a top wall 124 may be placed onto upper margins of the side walls 116, 118 to thereby enclose the interior space 108, and the top wall 124 detachably fastened onto the side walls 116, 118.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

It will be apparent to those having skill in the art that changes may be made to the details of the above-described embodiments without departing from the underlying principles of the present disclosure. The scope of the present invention should, therefore, be determined only by the following claims.

The invention claimed is:

1. A reusable container for transporting and/or storing a fuel cell including a liquid fuel bladder, the container comprising:
    a floor and walls defining an interior space sized to receive and contain the liquid fuel bladder;
    at least one resilient cushioning insert sized to nest within the interior space, shaped to cradle and support the liquid fuel bladder above the floor and away from the walls, and having an aperture formed therein which extends therethrough from an inwardly-facing surface to an outwardly-facing surface of the cushioning insert; and
    a plurality of straps that extend inwardly from the walls of the container for attachment to the liquid fuel bladder when the fuel cell is placed within the container, the straps being distributed along at least some of the walls on opposing sides of the interior space and being tensionable when attached to the liquid fuel bladder so as to suspend at least a portion of the fuel cell from the walls of the container.

2. The container of claim 1, wherein each strap is attached to at least one wall of the container.

3. The container of claim 2, wherein each of the walls includes a frame that supports a panel, and each of the straps is attached to the frame of one or more of the walls.

4. The container of claim 1, wherein each of the straps has an adjustable section having a length that is adjustable for tensioning the strap.

5. The container of claim 4, wherein the strap includes a hook or other connector at one end of the adjustable section, the hook being slidable along the strap when the length of the adjustable section is adjusted.

6. The container of claim 1, wherein the cushioning insert is made of multiple pieces or sections of material.

7. The container of claim 1, wherein the cushioning insert is made of closed cell foam.

8. The container of claim 1, wherein the cushioning insert includes an upper surface that slopes downwardly from a first end of the cushioning insert and then upwardly toward a second end of the cushioning insert opposite the first end.

9. The container of claim 1, wherein the cushioning insert is replaceable with a second cushioning insert having a shape that is different from the cushioning insert.

10. The container of claim 1, wherein the walls include upstanding side walls supported on the floor and a top wall connected to upper margins of the side walls, to thereby enclose the interior space.

11. The container of claim 10, wherein the top wall is detachably coupled to the side walls by fasteners.

12. The container of claim 11, wherein the fasteners include toggle latches.

13. The container of claim 11, wherein the top wall is removable to allow the fuel cell to be hoisted out of the container.

14. The container of claim 11, further comprising at least one lift point secured to the top wall and not secured to the side walls, so that, when the fasteners are detached, the lift point can be used to lift the top wall from the side walls of the container.

15. The container of claim 11, further comprising three or more sets of lift point hardware secured to the top wall along a periphery of the top wall.

16. The container of claim 11, wherein at least one of the side walls is removable to allow the fuel cell to be removed from a side of the container.

17. The container of claim 1, wherein at least one of the walls includes an inspection opening that is closed by a cover, the cover being movable away from the inspection opening to allow visual inspection of the fuel cell when inside the container.

18. The container of claim 1, wherein the walls and/or floor of the container are made of wood, plastic, metal or a composite.

19. The container of claim 1, wherein said at least one resilient cushioning insert is a single unitary contoured cushioning element that lines both the floor and the walls of the container.

20. A package including the container of claim 1 and the fuel cell positioned within the container, and wherein the fuel cell is attached to the container via the straps.

21. The package of claim 20, wherein:
the fuel cell includes attachment loops fixed to the outside of the liquid fuel bladder and laterally spaced apart, and
the straps are detachably attached to the liquid fuel bladder via the attachment loops.

22. A reusable container for transporting and/or storing a fuel cell including a liquid fuel bladder, the container comprising:
a floor and walls defining an interior space sized to receive and contain the liquid fuel bladder;
at least one resilient cushioning insert sized to nest within the interior space, shaped to cradle and support the liquid fuel bladder above the floor and away from the walls, and having an aperture formed therein which extends therethrough from an inwardly-facing surface to an outwardly-facing surface of the cushioning insert; and
a plurality of straps that extend inwardly from the walls of the container for attachment to the liquid fuel bladder when the fuel cell is placed within the container, the straps being distributed along at least some of the walls on opposing sides of the interior space and being tensionable when attached to the liquid fuel bladder so as to suspend at least a portion of the fuel cell from the walls of the container,
wherein said at least one resilient cushioning insert includes a lower cushioning insert having three distinct sloped portions including:
a first sloped portion having a first slope;
a second sloped portion having a second slope that slopes upwardly away from first sloped portion; and
a third sloped portion having a third slope that slopes upwardly away from the first and second sloped portions, and wherein:
the first slope is greater than the second slope and greater than the third slope, and
at least one of the first, second, and third slopes is constant along an entire length of the respective first, second, or third sloped portion.

23. The container of claim 22, wherein said at least one resilient cushioning insert is a single unitary contoured cushioning element that lines both the floor and the walls of the container.

* * * * *